US008285134B2

(12) United States Patent
Joo (10) Patent No.: US 8,285,134 B2
(45) Date of Patent: Oct. 9, 2012

(54) WIDE DYNAMIC RANGE HARDWARE APPARATUS AND PHOTOGRAPHING APPARATUS INCLUDING THE SAME

(75) Inventor: Soo-kyung Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 13/017,152

(22) Filed: Jan. 31, 2011

(65) Prior Publication Data

US 2011/0194850 A1 Aug. 11, 2011

(30) Foreign Application Priority Data

Feb. 11, 2010 (KR) ........................ 10-2010-0012896

(51) Int. Cl.
*G03B 7/00* (2006.01)
(52) U.S. Cl. ....................................... 396/213; 348/663
(58) Field of Classification Search .................. 396/213; 348/663
See application file for complete search history.

(56) References Cited

U.S. PATENT DOCUMENTS

| 5,929,908 A * | 7/1999 | Takahashi et al. ............. 348/364 |
| 6,747,694 B1 * | 6/2004 | Nishikawa et al. ......... 348/229.1 |
| 8,135,235 B2 * | 3/2012 | Kang et al. ..................... 382/276 |
| 2004/0095472 A1 * | 5/2004 | Yoshida et al. ........... 348/208.12 |
| 2008/0095408 A1 * | 4/2008 | Yokohata et al. ............. 382/106 |
| 2012/0050557 A1 * | 3/2012 | Atanassov et al. ......... 348/222.1 |

* cited by examiner

*Primary Examiner* — Clayton E Laballe
*Assistant Examiner* — Linda B Smith
(74) *Attorney, Agent, or Firm* — Drinker Biddle & Reath LLP (57) ABSTRACT

A wide dynamic range (WDR) hardware apparatus and a photographing apparatus including the WDR hardware apparatus are provided where the WDR unit applies weight coefficients to a luminance signal of a small size image having a first exposure time and a luminance signal of a small size image having a second exposure time longer than the first exposure time. The system combines the luminance signals applied weight coefficients, applies weight coefficients to a luminance signal of an original size image having the first exposure time and a luminance signal of an original size image having the second exposure time, and combines the luminance signals applied weight coefficients.

15 Claims, 7 Drawing Sheets

WIDE DYNAMIC RANGE HARDWARE APPARATUS AND PHOTOGRAPHING APPARATUS INCLUDING THE SAME

CROSS-REFERENCE TO RELATED PATENT APPLICATION

This application claims the benefit of Korean Patent Application No. 10-2010-0012896, filed on Feb. 11, 2010, in the Korean Intellectual Property Office, the disclosure of which is incorporated herein in its entirety by reference.

BACKGROUND

Various embodiments of the invention relate to a wide dynamic range (WDR) hardware apparatus and a photographing apparatus including the WDR hardware apparatus, and more particularly, to a WDR hardware apparatus capable of reducing a design area and a photographing apparatus including the WDR hardware apparatus.

When a subject is photographed using a digital camera, if a background of the subject is too bright, the subject is relatively dark, which is called back light. Back light compensation (BLC) is required to acquire a better quality image.

BLC performed by a photographing apparatus using an image pickup device is used to identify a subject that is dark while a background is bright when the subject is photographed under back light circumstances and is displayed on a monitor. Namely, BLC is used to enhance image quality in back light circumstances. When the entire brightness of an image on which BLC is performed is controlled, a dark area of the image becomes bright while a bright area thereof is brighter, which makes a boundary of a subject unclear or causes loss of information of the bright area.

A wide dynamic range (WDR) technology combines an image in which a bright area is clearly seen by controlling exposure thereof and different images in which dark areas are clearly seen by controlling exposure thereof, and generates an image in which bright and dark areas are very clearly seen.

Such a WDR function has a wide range of applications in all image photographing apparatuses such as surveillance cameras for security and monitoring, general digital cameras, broadcast photographing equipments, vehicle cameras, mobile phone cameras, and the like.

BLC that uses the WDR function processes and combines images having different exposure times, which requires a large design area for processors and supporting circuitry, a large amount of calculation time, and power consumption.

SUMMARY

Various embodiments of the invention provide a wide dynamic range (WDR) hardware apparatus capable of compensating for back light in real time without using an additional device such as a flash and a photographing apparatus including the WDR hardware apparatus.

According to an embodiment of the invention, there is provided a wide dynamic range (WDR) hardware apparatus including: a first multiplier for multiplying a weight coefficient to a luminance signal of a small size image having a first exposure time and a luminance signal of an original size image having the first exposure time and input at a predetermined time difference from the small size image; a second multiplier for multiplying a weight coefficient to a luminance signal of a small size image having a second exposure time longer than the first exposure time and a luminance signal of an original size image having the second exposure time and input at a predetermined time difference from the small size image; and an adder for generating a first combination signal by adding the luminance signal of the small size image having the first exposure time to which the weight coefficient is multiplied and the luminance signal of the small size image having the second exposure time to which the weight coefficient is multiplied, and generating a second combination signal by adding the luminance signal of the original size image having the first exposure time to which the weight coefficient is multiplied and the luminance signal of the original size image having the second exposure time to which the weight coefficient is multiplied.

According to another embodiment of the invention, there is provided a photographing apparatus including: an image pickup device for obtaining an image having different exposure times; and a WDR unit for applying weight coefficients to a luminance signal of a small size image having a first exposure time and a luminance signal of a small size image having a second exposure time longer than the first exposure time, combining the luminance signals' applied weight coefficients, applying weight coefficients to a luminance signal of an original size image having the first exposure time and a luminance signal of an original size image having the second exposure time, and combining the luminance signals' applied weight coefficients.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, embodiments of the invention will be described more fully with reference to the accompanying drawings, in which exemplary embodiments of the invention are shown. Like reference numerals denote like elements throughout. While describing these embodiments, detailed descriptions about related well known functions or configurations that may blur the points of the invention are omitted.

Figure 1:
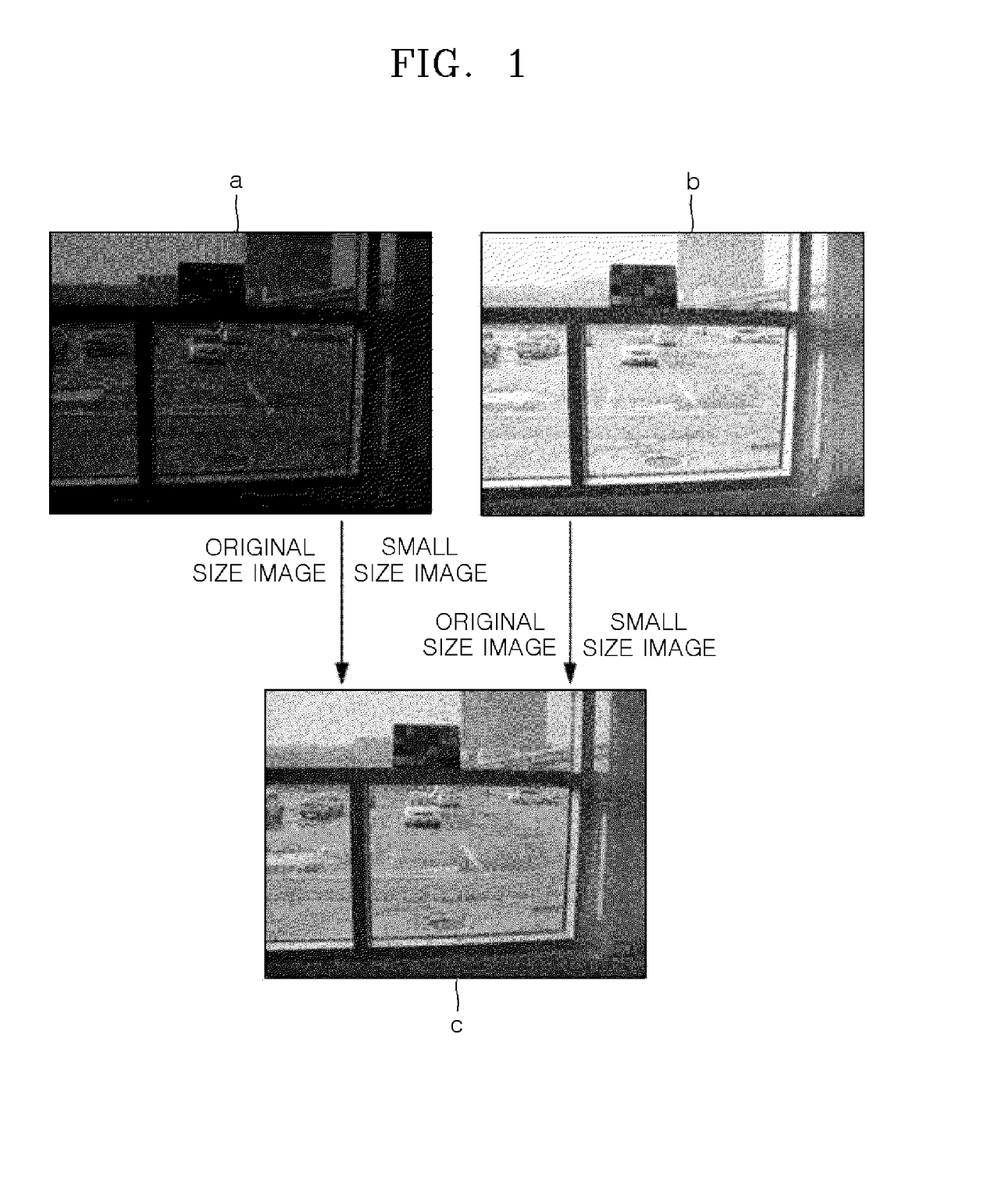
FIG. 1 shows pictorial images for explaining a wide dynamic range (WDR) method, according to an embodiment of the invention.

FIG. 1 shows images for explaining a wide dynamic range (WDR) method, according to an embodiment of the invention. Referring to FIG. 1, the WDR method: 1) obtains an image (a) that has a short exposure time and is photographed at a fast shutter speed and an image (b) that has a long exposure time and is photographed at a slow shutter speed; 2) processes original size images and small size images of the images; and 3) outputs a WDR image (c) on which back light is compensated for.

A process for processing the small size images of the images and detecting a maximum luminance value and a minimum luminance value of each pixel is performed. Thereafter, a process for processing the original size images of the images and compensating for the luminance of each pixel is performed. The process for compensating for the luminance of each pixel uses the detected maximum and minimum luminance values of each pixel.

The processes for processing the small size images and the original size images include a redundant operation. Thus, a system for processing the above processes is used to process each operation by using the same operation circuit with a temporal difference according to a process sequence. The hardware related to the processing may be embedded in a digital signal processor (DSP) of a digital image processing apparatus.

Figure 2:
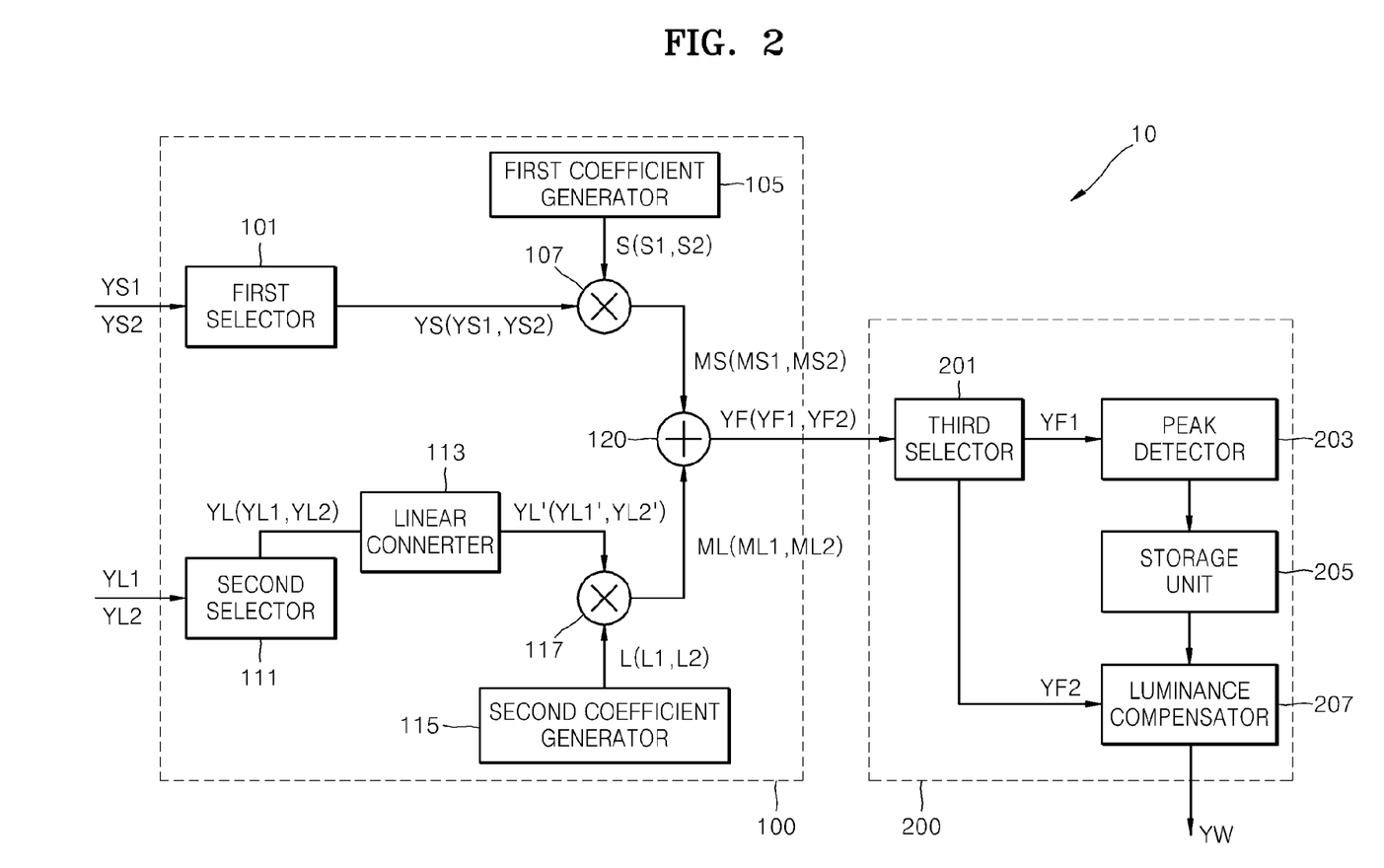
FIG. 2 is a schematic block diagram of a system for performing a WDR algorithm, according to an embodiment of the invention.

FIG. 2 is a schematic block diagram of exemplary hardware and/or software algorithms 10 for performing a WDR algorithm, according to an embodiment of the invention. Referring to FIG. 2, the hardware 10 (hereinafter referred to as a "WDR hardware device") for performing the WDR algorithm includes a first operation unit 100 and a second operation unit 200.

The first operation unit 100 combines a luminance signal YS having a short exposure time and a luminance signal YL having a long exposure time by using a weight coefficient.

The first operation unit 100 includes a first selector 101, a first coefficient generator 105, a first multiplier 107, a second selector 111, a linear converter 113, a second coefficient generator 115, a second multiplier 117, and an adder 120.

The first selector 101 temporarily stores a luminance signal YS1 of an original size image having a short exposure time and a luminance signal YS2 of a small size image of the original size image, and selectively outputs the luminance signals YS1 and YS2 at a predetermined time. The first selector 101 outputs the luminance signal YS2 in order to obtain a maximum luminance value and a minimum luminance value of each pixel, and the luminance signal YS1 in order to generate an image signal having a compensated luminance using the obtained maximum and minimum luminance values of each pixel. The first selector 101 may be a register circuit in order to selectively output a signal according to a control signal.

The second selector 111 temporarily stores a luminance signal YL1 of an original size image having a long exposure time and a luminance signal YL2 of a small size image of the original size image, and selectively outputs the luminance signals YL1 and YL2 at a predetermined time. The second selector 111 outputs the luminance signal YL2 in order to obtain a maximum luminance value and a minimum luminance value of each pixel, and the luminance signal YL1 in order to generate an image signal having a compensated luminance using the obtained maximum and minimum luminance values of each pixel. The second selector 111 may be a register circuit in order to selectively output a signal according to a control signal.

That is, the first selector 101 and the second selector 111 simultaneously outputs the luminance signals YS2 and YL2 in order to obtain the maximum luminance and minimum luminance values of each pixel and simultaneously outputs the luminance signals YS1 and YL1 in order to obtain the image signal having a compensated luminance.

Figure 3:
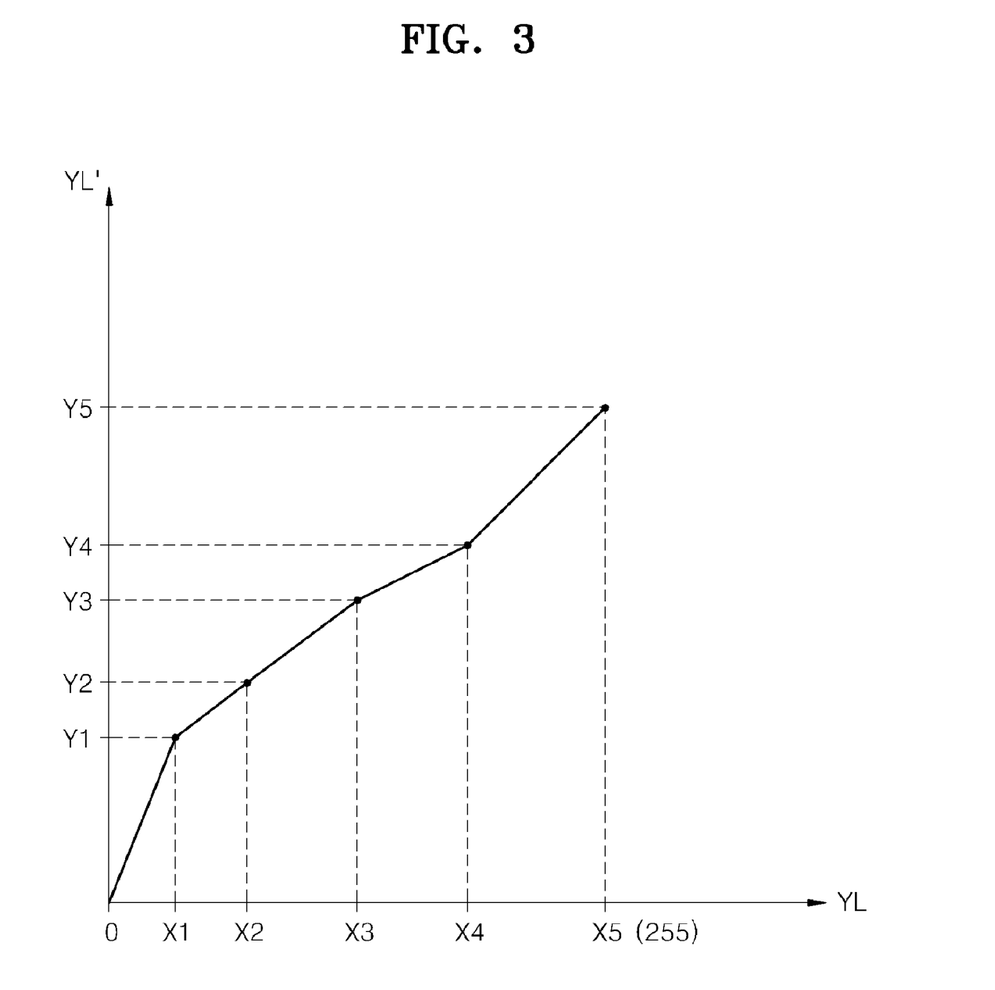
FIG. 3 is a graph for explaining a piecewise linear approximation method, according to an embodiment of the invention.

The linear converter 113 processes the luminance signals YL1 and YL2 output from the second selector 111 using a piecewise linear approximation method as shown in FIG. 3. Referring to FIG. 3, the input luminance signals YL1 and YL2 may be processed by applying different amplification rates of output luminance signals YL1' and YL2' according to luminance levels using the piecewise linear approximation method. In the present embodiment, the input luminance signals YL1 and YL2 and the output luminance signals YL1' and YL2' are related to five (x,y) coordinates. A luminance value of an image obtained during a long exposure time may change for the characteristics of a sensor (an image pickup device) according to the linear conversion.

The first coefficient generator 105 calculates a weight coefficient S1 of the luminance signal YS1 according to a luminance level of the luminance signal YS1 and a luminance level of the output luminance signal YL1'. The first coefficient generator 105 calculates a weight coefficient S2 of the luminance signal YS2 according to a luminance level of the luminance signal YS2 and a luminance level of the output luminance signal YL2'.

The first multiplier 107 multiplies the weight coefficient S1 input from the first coefficient generator 105 to the luminance signal YS1 and outputs a luminance signal MS1. The first multiplier 107 multiplies the weight coefficient S2 input from the first coefficient generator 105 to the luminance signal YS2 and outputs a luminance signal MS2.

The second coefficient generator 115 multiplies a weight coefficient L1 of the output luminance signal YL1' according to the luminance level of the luminance signal YS1 and the luminance level of the output luminance signal YL1'. The second coefficient generator 115 multiplies a weight coefficient L2 of the output luminance signal YL2' according to the luminance level of the luminance signal YS2 and the luminance level of the output luminance signal YL2'. The second multiplier 117 multiplies the weight coefficient L1 input from the second coefficient generator 115 to the input luminance signal YL1 and outputs a luminance signal ML1. The second multiplier 117 multiplies the weight coefficient L2 input from the second coefficient generator 115 to the input luminance signal YL2 and outputs a luminance signal ML2.

The weight coefficients S1 and S2 and the weight coefficients L1 and L2 have a complementary relationship as Equation (1) below.

$$S1+L1=256$$

$$S2+L2=256 \quad (1)$$

Figure 4:
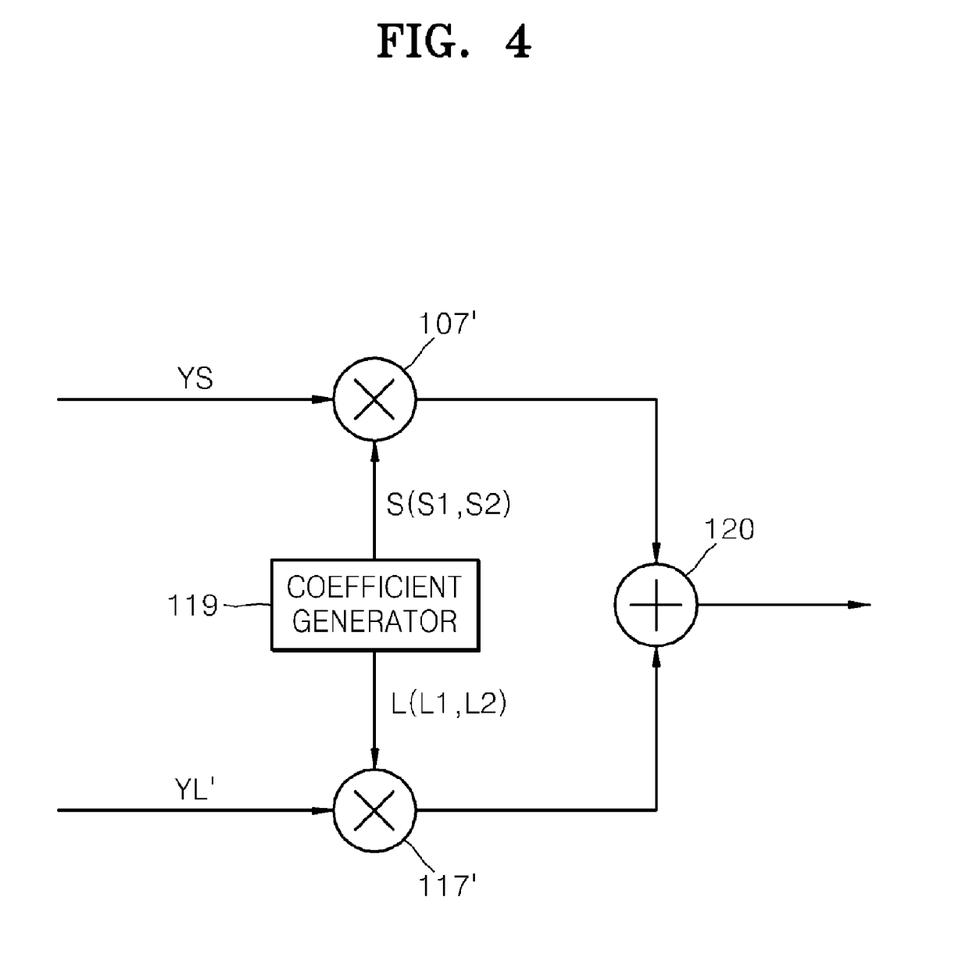
FIG. 4 is a schematic block diagram of a coefficient generator, according to an embodiment of the invention.

Although the first coefficient generator 105 and the second coefficient generator 115 are separated from each other in FIG. 2, a single coefficient generator 119 may output the weight coefficients S1 and S2 and the weight coefficients L1 and L2 to the first multiplier 107' and the second multiplier 117', respectively, as shown in FIG. 4.

The adder 120 adds the output signals MS1 and MS2 of the first multiplier 107 and the output signals ML1 and ML2 of the second multiplier 117. Combined luminance signals YF1 and YF2 by the addition are as indicated in Equation (2) below. The luminance signals YF1 and YF2 are output to a third selector 201 of the second operation unit 200.

$$YF1=(MS1+ML1)/256=(S1/256)*YS1+(L1/256)*YL1$$

$$YF2=(MS2+ML2)/256=(S2/256)*YS2+(L2/256)*YL2 \quad (2)$$

The second operation unit 200 compensates for the luminance signals YF1 and YF2 output from the first operation unit 100 and generates a dynamic range luminance signal YW.

The second operation unit 200 includes a third selector 201, a peak detector 203, a storage unit 205, and a luminance compensator 207.

The third selector 201 determines whether it is the luminance signal YF1 for a small size image and the luminance signal YF2 for an original size image, and selectively outputs the determined luminance signal to the peak detector 203 or the luminance compensator 207 at a predetermined time. If the luminance signal YF1 for the small size image is determined, the third selector 201 outputs the luminance signal YF1 to the peak detector 203. If the luminance signal YF2 for the original size image is determined, the third selector 201 outputs the luminance signal YF2 to the luminance compensator 207. The third selector 201 may be a register circuit to selectively output a signal according to a control signal.

The peak detector 203 receives the luminance signal YF1 from the third selector 201 and calculates a maximum luminance value MAX and a minimum luminance value MIN of each pixel.

The storage unit 205 functions as a buffer for temporarily storing the calculated maximum luminance value MAX and minimum luminance value MIN of each pixel. The storage unit 205 may be a flip flop or an internal memory.

The luminance compensator 207 receives the luminance signal YF2 from the third selector 201 and receives the maximum luminance value MAX and the minimum luminance value MIN from the storage unit 205. The luminance compensator 207 compensates for luminance of the luminance signal YF2 using the maximum luminance value MAX and the minimum luminance value MIN, and outputs the dynamic range luminance signal YW. The dynamic range luminance signal YW is calculated according to Equation 3 below.

$$YW = 255 \times \frac{YF2 - MIN}{MAX - MIN} \quad (3)$$

Since the weight coefficient is a variable in the present embodiment, it is necessarily required to use a multiplier (a multiplication operation unit). Thus, the WDR hardware device 10 of the present embodiment shares a common multiplication operation between processes for processing a small size image and an original size image.

Figure 5:
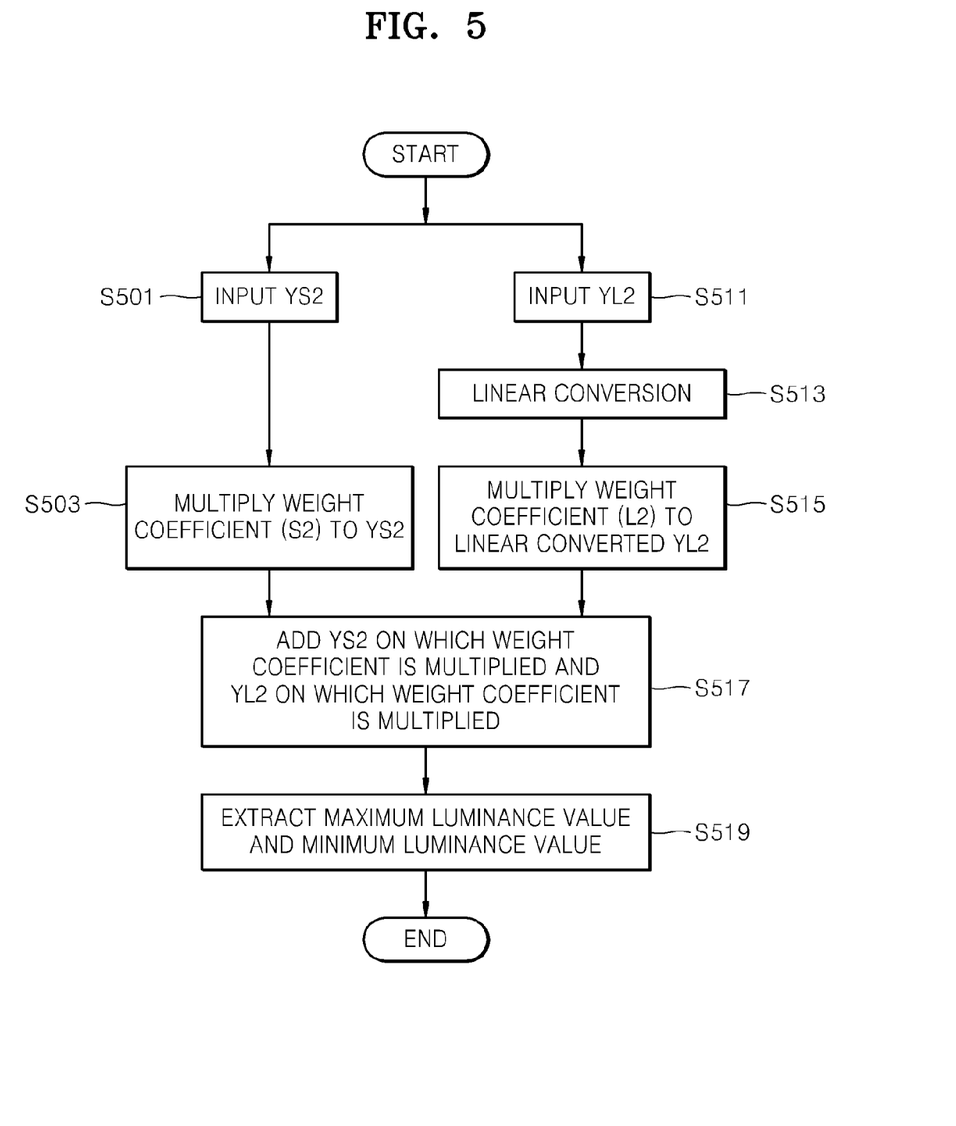
FIG. 5 is a flowchart illustrating a process for processing a luminance signal of a small size image in a WDR hardware device of FIG. 2, according to an embodiment of the invention.

FIG. 5 is a flowchart illustrating a process for processing a luminance signal of a small size image in a WDR hardware device of FIG. 2, according to an embodiment of the invention.

Referring to FIG. 5, the first selector 101 inputs the luminance signal YS2 of the small size image among the luminance signal YS2 of the small size image having a short exposure time and the luminance signal YS1 of the original size image having a short exposure time (operation S501).

The second selector 111 inputs the luminance signal YL2 of the small size image among the luminance signal YL2 of the small size image having a long exposure time and the luminance signal YL1 of the original size image having a long exposure time (operation S511). The linear converter 113 linearly converts the luminance signal YL2 of the small size image having a long exposure time to have a luminance value for the characteristics of a sensor (operation S513).

The first multiplier 107 multiplies the weight coefficient S2 to the luminance signal YS2 and performs weight processing on the multiplied luminance signal YS2 (operation S503).

The second multiplier 117 multiplies the weight coefficient L2 to the linearly converted luminance signal YL2 and performs weight processing on the multiplied luminance signal YL2 (operation S515).

The adder 120 adds the luminance signals YS2 and YL2 on which weight processing is performed and outputs the luminance signal YF2 as in Equation 2 (operation S517).

The third selector 201 outputs the luminance signal YF2 to the peak detector 203. The peak detector 203 detects a maximum luminance value and a minimum luminance value of each pixel from the luminance signal YF2 (operation S519). The detected maximum luminance value and minimum luminance value of each pixel is stored in a memory.

Figure 6:
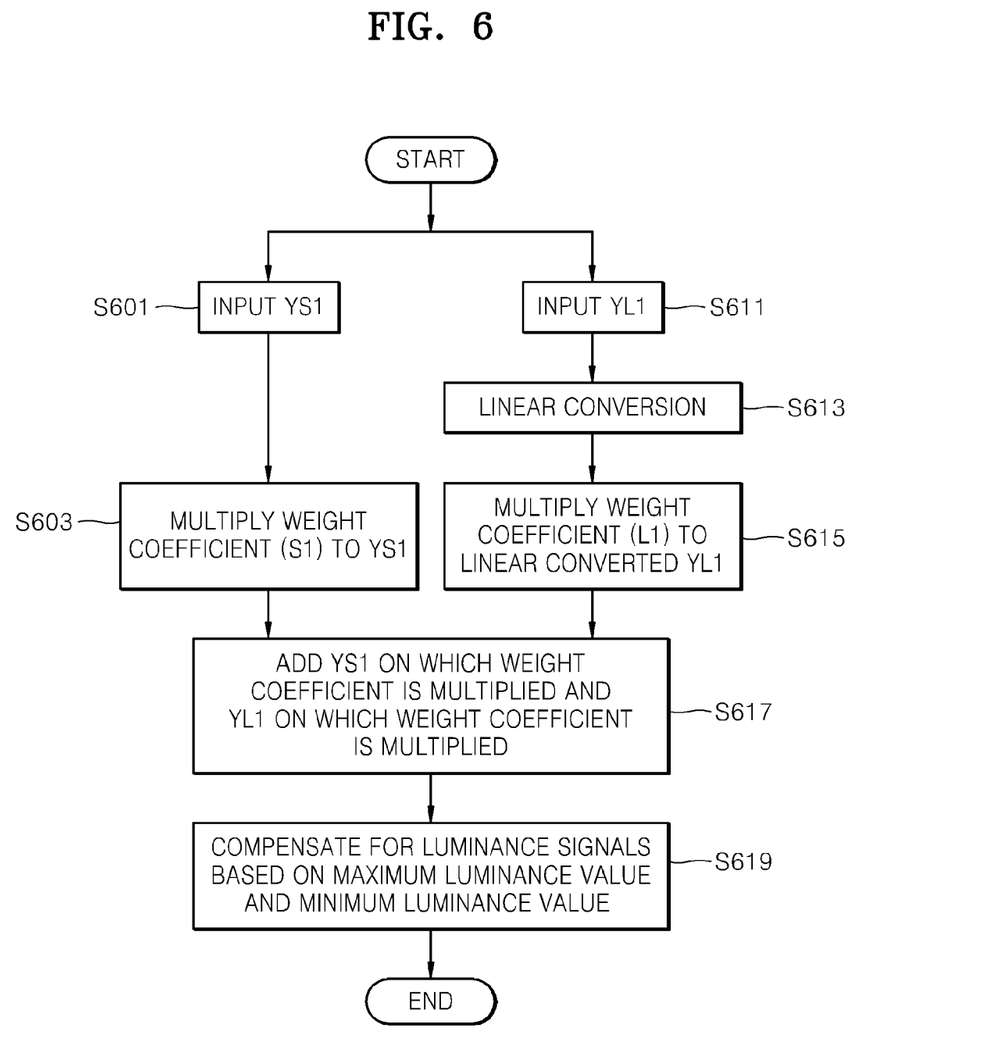
FIG. 6 is a flowchart illustrating a process for processing a luminance signal of an original size image in the WDR hardware device of FIG. 2, according to an embodiment of the invention.

FIG. 6 is a flowchart illustrating a process for processing a luminance signal of an original size image in the WDR hardware device of FIG. 2, according to an embodiment of the invention.

Referring to FIG. 6, the first selector 101 inputs the luminance signal YS1 of the original size image among the luminance signal YS2 of the small size image having a short exposure time and the luminance signal YS1 of the original size image having a short exposure time (operation S601).

The second selector 111 inputs the luminance signal YL1 of the original size image among the luminance signal YL2 of the small size image having a long exposure time and the luminance signal YL1 of the original size image having a long exposure time (operation S611).

The linear converter 113 linearly converts the luminance signal YL1 of the original size image having a long exposure time to have a luminance value for the characteristics of a sensor (operation S613).

The first multiplier 107 multiplies the weight coefficient S1 to the luminance signal YS1 and performs weight processing on the multiplied luminance signal YS1 (operation S603).

The second multiplier 117 multiplies the weight coefficient L1 to the linearly converted luminance signal YL1 and performs weight processing on the multiplied luminance signal YL1 (operation S615).

The adder 120 adds the luminance signals YS1 and YL1 on which weight processing is performed and outputs the luminance signal YF1 as in Equation 2 (operation S617).

The third selector 201 outputs the luminance signal YF1 to the luminance compensator 207. The luminance compensator 207 receives a maximum luminance value and a minimum luminance value extracted from the luminance signal YF2, and compensates for a luminance value of an image that is a combination of the images having the short exposure time and the long exposure time (operation S619).

Figure 7:
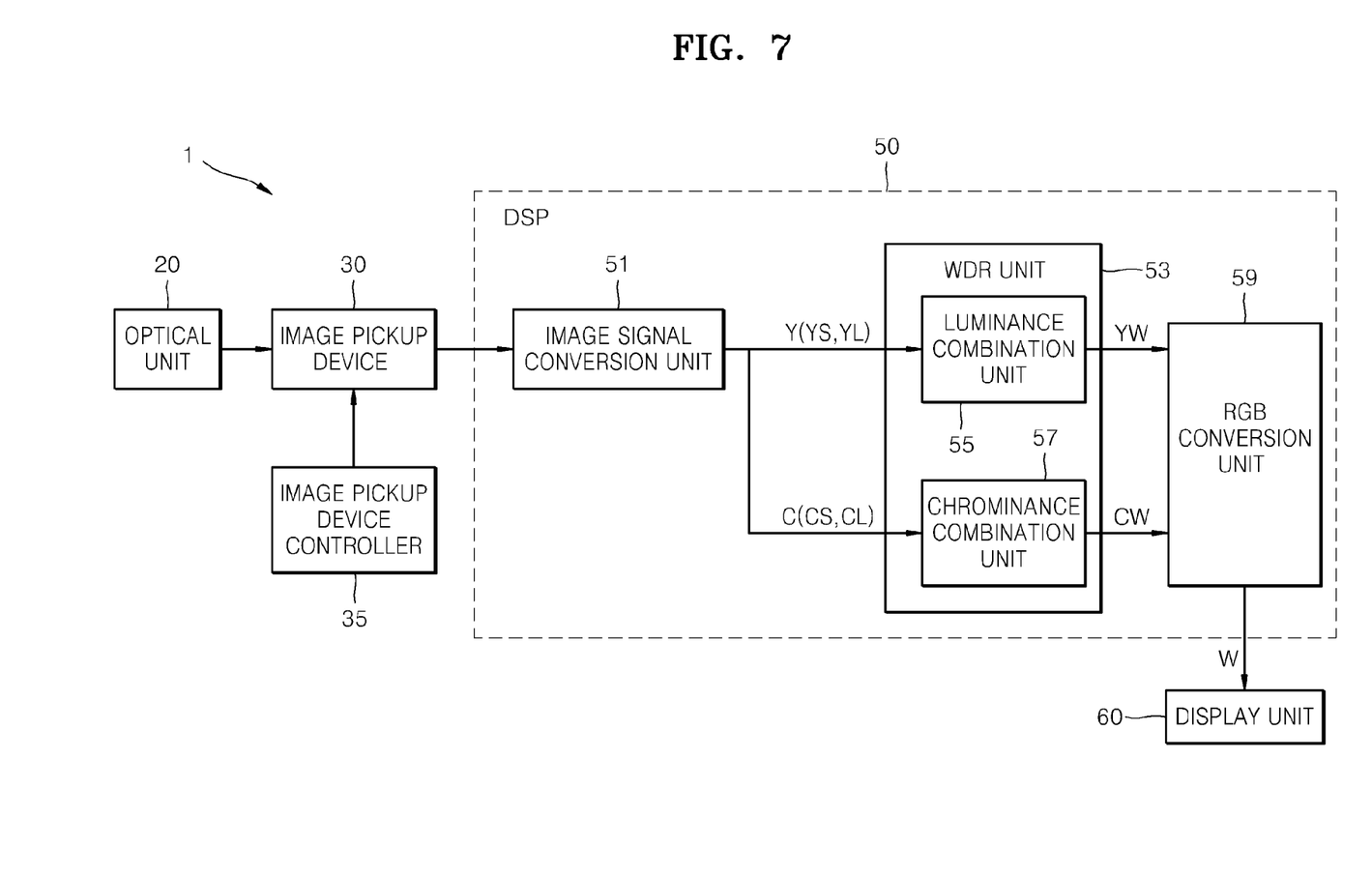
FIG. 7 is a schematic block diagram of a digital photographing apparatus including the WDR hardware device of FIG. 2, according to an embodiment of the invention.

FIG. 7 is a schematic block diagram of a digital photographing apparatus 1 including the WDR hardware device of FIG. 2, according to an embodiment of the invention.

Referring to FIG. 7, the photographing apparatus is a digital camera; however, the invention is not limited thereto. The photographing apparatus includes a variety of digital image processing apparatuses such as a mobile phone, a camcorder, a monitoring camera, a robot, a personal digital assistant (PAD), a personal multimedia player (PMP), etc., for performing digital image processing including a still image and a moving image.

Referring to FIG. 7, the digital photographing apparatus 1 may include an optical unit 20, an image pickup device 30, an image pickup device controller 35, a DSP 50, and a display unit 60.

The optical unit 20 provides the image pickup device 30 with an optical signal input from a subject. The optical unit 20 may include a zoom lens for widening or narrowing a viewing angle according to a focal length, and at least one lenses such as a focus lens for focusing on the subject. The optical unit 20 may further include an iris for adjusting the amount of light.

An optical signal passing through the optical unit 20 reaches a light-receiving surface of the image pickup device 30 and forms an image of the subject. The image pickup device 30 may be a complementary metal oxide semiconductor image sensor (CIS) or a charge coupled device (CCD) to convert the optical signal into an electric signal. Sensitivity of the image pickup device 30 may be controlled by the image pickup device controller 35. The image pickup device controller 35 may control the image pickup device 30 according to a control signal that is manually input by a user's manipulation, or a control signal that is automatically generated in response to an image signal that is input in real time. The image pickup device 30 obtains an image photographed by adjusting a long exposure time for the subject and an image photographed by adjusting a short exposure time for the subject.

The display unit 60 displays an operation state of the digital photographing apparatus 1 or image data captured by the digital photographing apparatus 1. The display unit 60 may provide visual information and/or audible information to a user. The display unit 60 may include a liquid crystal display (LCD) panel, an organic light-emitting display (OLED) panel, an electrophoretic display panel (EPD), or other similar type of display unit. The display unit 60 may be in the form of a touch screen in order to receive a user's touch input, and may operate as a user input interface along with a manipulation unit (not shown).

The DSP 50 processes an image signal input into the digital photographing apparatus 1 and controls each element of the digital photographing apparatus 1 according to the input image signal or an external input signal. The DSP 50 may be electrically connected to the image pickup device 30, the display unit 60, etc., communicate a control signal with the elements to control an operation of each element, or performs a function of processing data. The DSP 50 may be realized as a micro chip or a circuit board including the micro chip. The elements included in the DSP 50 may be realized as software or circuits embedded in the DSP 50. The DSP 50 may include WDR hardware for performing a WDR algorithm.

The DSP 50 includes an image signal conversion unit 51, a WDR unit 53, and an RGB conversion unit 59.

The image signal conversion unit 51 receives image signals of raw data having different exposure times obtained from the image pickup device 30, for example, a CCD image sensor. The image signal conversion unit 51 receives an original image signal having a relatively short exposure time for the subject and an original image signal having a relatively long exposure time, and generates small size image signals of the original size image signals. The image signal conversion unit 51 converts the image signals received from the image signal conversion unit 51 into a luminance signal Y including a luminance component and a chrominance signal C including a chrominance component.

Each image signal is divided into one luminance component Y and two chrominance components. The luminance Y expresses a bright and dark degree. The chrominance C expresses color information. The two chrominance components have Cr and Cb values. Cr denotes a difference between a reference value and a red component. Cb denotes a difference between the reference value and a blue component.

The luminance component and the chrominance component are separated to process WDR, which reduces complexity of hardware compared to using of a general RGB color space, and reduces color imbalance caused by adjusting R, G, and B components.

The image signal conversion unit 51 receives an image signal having a short exposure time, converts the image signal into a luminance signal YS and a chrominance signal CS, receives an image signal having a long exposure time, and converts the image signal into a luminance signal YL and a chrominance signal CL. The luminance signal YS includes a luminance signal YS1 for an original size image and a luminance signal YS2 for a small size image. The luminance signal YL includes a luminance signal YL1 for the original size image and a luminance signal YL2 for the small size image.

The WDR unit 53 includes a luminance combination unit 55 and a chrominance combination unit 57.

The luminance combination unit 55 may be the WDR hardware of FIG. 2 and thus the detailed description thereof will not be repeated. The luminance combination unit 55 performs a process for processing small size images having different exposure times and calculating a maximum luminance value and a minimum luminance value and a process for processing an original size image having different exposure times and generating a WDR signal having a compensated luminance value at different times. The luminance combination unit 55 may process a linear conversion, a multiplication operation, an addition operation, etc., that are redundant in the two processes using the same operation circuit. The luminance combination unit 55 identifies and processes the two processes according to a control signal.

When the two processes are separately performed, much calculation time and power consumption are required. In the present embodiment, the WDR hardware for performing the two processes is used, and similar algorithms are processed using the same operation circuit at different times. Thus, unnecessary design area and power consumption are reduced.

The luminance combination unit 55 processes the luminance signal YS of the small size image having different exposure times and the luminance signal YL of the original size image at different times. The luminance signal YS of the small size image is used to calculate a maximum luminance value and a minimum luminance value of each pixel, and the small size image is used to reduce a processing time. The luminance signal YL of the original size image is used to generate a WDR signal having a compensated luminance value using the maximum luminance value and the minimum luminance value.

The luminance combination unit 55 includes a mode selector as a register circuit to select a process of the luminance signal YS of the small size image having different exposure times and the luminance signal YL of the original size image having different exposure times.

The chrominance combination unit 57 outputs a dynamic range chrominance signal CW having an average of the chrominance signal CS of an image having a short exposure time and a chrominance signal CL of an image having a long exposure time.

The RGB combination unit 59 converts the dynamic range luminance signal YW of the luminance combination unit 55 and the dynamic range chrominance signal CW of the chrominance combination unit 57 into an RGB signal and outputs a WDR image signal.

The above describes a system to share a redundant algorithm between WDR processes, thereby reducing a design area. Thus, an area of a semiconductor chip is reduced, and the number of chips that are to be produced per wafer is increased, thereby reducing production cost. Further, unnecessary circuits are reduced, thereby performing a process at low power consumption.

WDR hardware is embedded in a DSP, which does not require an additional parts and reduces production cost.

The device described herein may comprise or be associated with a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional embodiments may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional embodiments of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A wide dynamic range (WDR) hardware apparatus comprising:
    a first multiplier for multiplying a weight coefficient to a luminance signal of a small size image having a first exposure time and a luminance signal of an original size image having the first exposure time and input at a predetermined time difference from the small size image;
    a second multiplier for multiplying a weight coefficient to a luminance signal of a small size image having a second exposure time longer than the first exposure time and a luminance signal of an original size image having the second exposure time and input at a predetermined time difference from the small size image; and
    an adder for generating a first combination signal by adding the luminance signal of the small size image having the first exposure time to which the weight coefficient is multiplied and the luminance signal of the small size image having the second exposure time to which the weight coefficient is multiplied, and generating a second combination signal by adding the luminance signal of the original size image having the first exposure time to which the weight coefficient is multiplied and the luminance signal of the original size image having the second exposure time to which the weight coefficient is multiplied.

2. The WDR hardware apparatus of claim 1, further comprising:
    a first selector for selectively outputting the luminance signal of the small size image having the first exposure time and the luminance signal of the original size image having the first exposure time; and
    a second selector for selectively outputting the luminance signal of the small size image having the second exposure time and the luminance signal of the original size image having the second exposure time.

3. The WDR hardware apparatus of claim 1, further comprising:
    a coefficient generator for calculating the weight coefficients and outputting the weight coefficients to the first multiplier and the second multiplier.

4. The WDR hardware apparatus of claim 1, further comprising:
    a first coefficient generator for calculating the weight coefficients of the luminance signal of the small size image having the first exposure time and the luminance signal of the original size image having the first exposure time; and a second coefficient generator for calculating the weight coefficients of the luminance signal of the small size image having the second exposure time and the luminance signal of the original size image having the second exposure time.

5. The WDR hardware apparatus of claim 1, further comprising: a linear converter for linearly converting the luminance signal of the small size image having the second exposure time and the luminance signal of the original size image having the second exposure time.

6. The WDR hardware apparatus of claim 1, further comprising: a third selector for selectively outputting the first combination signal and the second combination signal.

7. The WDR hardware apparatus of claim 1, further comprising:
a peak detector for detecting a maximum luminance value and a minimum luminance value of each pixel from the first combination signal; and
a luminance compensator for compensating for a luminance signal of the second combination signal using the maximum luminance value and a minimum luminance value.

8. A photographing apparatus comprising:
an image pickup device for obtaining an image having different exposure times; and
a WDR unit for applying weight coefficients to a luminance signal of a small size image having a first exposure time and a luminance signal of a small size image having a second exposure time longer than the first exposure time, combining the luminance signals applied weight coefficients, applying weight coefficients to a luminance signal of an original size image having the first exposure time and a luminance signal of an original size image having the second exposure time, and combining the luminance signals applied weight coefficients.

9. The photographing apparatus of claim 8, wherein the WDR unit comprises:
a first multiplier for multiplying a weight coefficient to the luminance signal of the small size image having the first exposure time and the luminance signal of the original size image having the first exposure time and input at a predetermined time difference from the small size image;
a second multiplier for multiplying a weight coefficient to the luminance signal of the small size image having the second exposure time and the luminance signal of the original size image having the second exposure time and input at a predetermined time difference from the small size image; and
an adder for generating a first combination signal by adding the luminance signal of the small size image having the first exposure time to which the weight coefficient is multiplied and the luminance signal of the small size image having the second exposure time to which the weight coefficient is multiplied, and generating a second combination signal by adding the luminance signal of the original size image having the first exposure time to which the weight coefficient is multiplied and the luminance signal of the original size image having the second exposure time to which the weight coefficient is multiplied.

10. The photographing apparatus of claim 9, wherein the WDR unit further comprises:
a first selector for selectively outputting the luminance signal of the small size image having the first exposure time and the luminance signal of the original size image having the first exposure time; and
a second selector for selectively outputting the luminance signal of the small size image having the second exposure time and the luminance signal of the original size image having the second exposure time.

11. The photographing apparatus of claim 9, wherein the WDR unit further comprises:
a coefficient generator for calculating the weight coefficients and outputting the weight coefficients to the first multiplier and the second multiplier.

12. The photographing apparatus of claim 9, wherein the WDR unit further comprises:
a first coefficient generator for calculating the weight coefficients of the luminance signal of the small size image having the first exposure time and the luminance signal of the original size image having the first exposure time; and
a second coefficient generator for calculating the weight coefficients of the luminance signal of the small size image having the second exposure time and the luminance signal of the original size image having the second exposure time.

13. The photographing apparatus of claim 9, wherein the WDR unit further comprises:
a linear converter for linearly converting the luminance signal of the small size image having the second exposure time and the luminance signal of the original size image having the second exposure time.

14. The photographing apparatus of claim 9, wherein the WDR unit further comprises:
a third selector for selectively outputting the first combination signal and the second combination signal.

15. The photographing apparatus of claim 9, wherein the WDR unit further comprises:
a peak detector for detecting a maximum luminance value and a minimum luminance value from the first combination signal; and
a luminance compensator for compensating for a luminance signal of the second combination signal using the maximum luminance value and a minimum luminance value.

* * * * *